Sept. 23, 1969   G. D. HANCHETT   3,469,113
SWITCHING CIRCUIT EMBODYING PARALLED PAIR OF
CONTROLLED RECTIFIERS
Filed Feb. 28, 1966
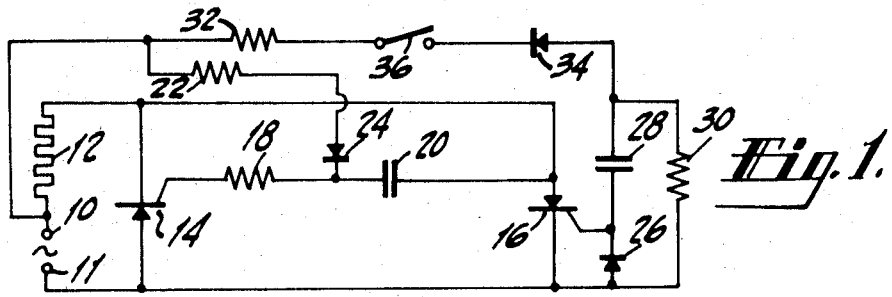
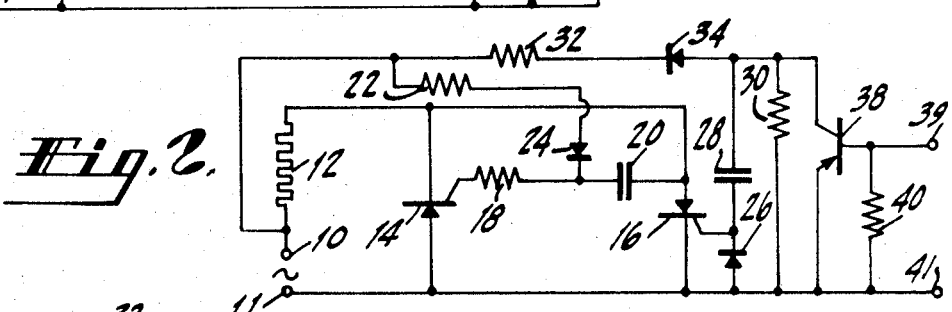
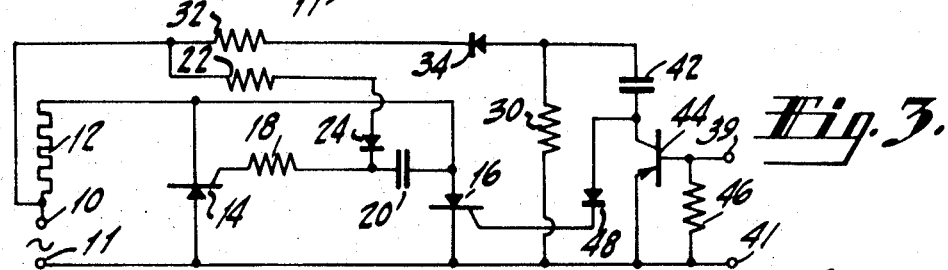
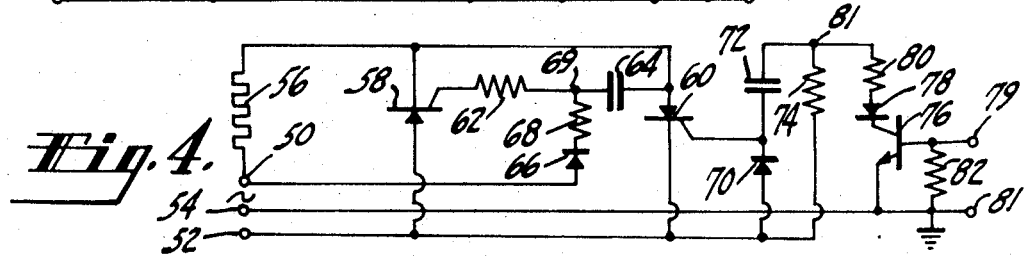
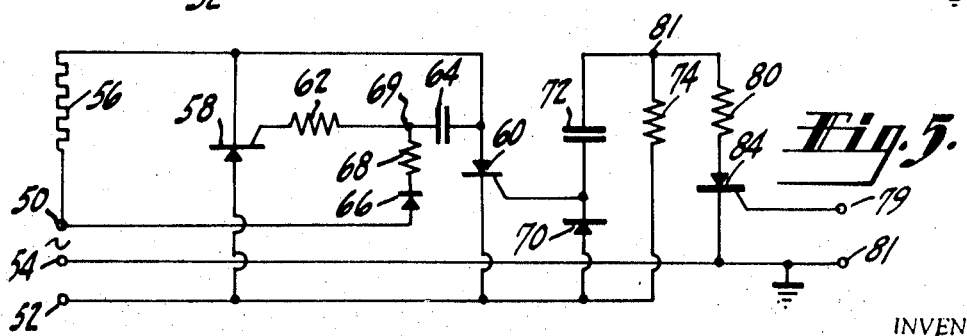
INVENTOR.
George D. Hanchett
BY
Edward J. Norton
Attorney

United States Patent Office 3,469,113
Patented Sept. 23, 1969

3,469,113
SWITCHING CIRCUIT EMBODYING PARALLEL PAIR OF CONTROLLED RECTIFIERS
George D. Hanchett, Summit, N.J., assignor to RCA Corporation, a corporation of Delaware
Filed Feb. 28, 1966, Ser. No. 530,601
Int. Cl. H03k 17/60
U.S. Cl. 307—252                         11 Claims

ABSTRACT OF THE DISCLOSURE

A load is supplied from a source of alternating current via a pair of oppositely poled silicon controlled rectifiers, connected in parallel, and a corresponding pair of capacitive time constant circuits. The circuit is designed to result in rectifier switching at low AC voltage levels to provide negligible transient interference.

This invention relates to switching circuits.

Many prior art switching circuits cause transients and interference in nearby radio and television receivers. Furthermore, many prior art switching circuits require considerable power to cause switching thereof compared to the power switched.

It is an object of this invention to provide a switching circuit that is substantially devoid of switching transients and that therefore will not cause interference in nearby radio and television receivers.

It is a further object of this invention to provide a switching circuit that can be switched on or off by very small power as compared to the power that is switched.

In accordance with one embodiment of this invention, the anode and the cathode of a controlled rectifier are connected across a pair of terminals to which a source of alternating current (AC) is applied. A time constant circuit is also connected across the AC terminals. The time constant circuit is charged during a half cycle of the alternating current when the voltage across the controlled rectifier is in the incorrect polarity to cause the controlled rectifier to become conductive, and the time constant circuit discharges to cause conduction of the controlled rectifier during the next half cyle of the alternating current supplied by the source. In accordance with another embodiment of this invention, the anodes and the cathodes of a first and a second controlled rectifier are connected in opposite conductivity directions across the series combination of a load and a pair of terminals to which a source of alternating current is connected. A first time constant circuit is charged from the source during a half cycle of the applied alternating current (AC) during which the voltage applied across the first of the controlled rectifiers is such as to render the first controlled rectifier non-conductive. Hwever, the first time constant circuit discharges during the next half cycle to cause the first of the controlled rectifiers to be conductive. A second time constant circuit is charged from across the load during the half cycle that the second controlled rectifier is not conductive, and the second time constant circuit discharges during the next half cycle to cause the second controlled rectifier to become conductive.

In the case of both embodiments, the operation is such that the controlled rectifiers become conductive (when they do) when the voltage applied between their anodes and cathodes is low and continue to be conductive as long as the voltage applied across the controlled rectifiers is high enough to sustain conduction therethrough. Since the voltages at which the controlled rectifiers become conductive and non-conductive are very low, the switching transients caused by the switching circuit are minimal and interference with nearby radio and television receivers is minimized. Also, one of the time constant circuits may be prevented from charging or may be permitted to charge by the expenditure of very little power whereby a sensitive, easily controllable switching circuit is provided.

The invention will be more fully understood when the following description is read in conjunction with the accompanying drawing in which:

FIGURE 1 is a circuit diagram of one embodiment of a circuit embodying the invention, and FIGURES 2 through 5 are circuit diagrams of further embodiments of the invention.

In FIGURE 1, one terminal 10 of an alternating current supply (not shown) is connected to one terminal of a load 12. This load, for example, may be the heater portion of an electric blanket or an electric cooking device. Alternately, the load may be a heater for space heating or it may be a motor or other load. The cathode of a silicon controlled rectifier (SCR) 14 and the anode of an SCR 16 are connected to the other terminal of the load 12. The anode of the SCR 14 and the cathode of the SCR 16 are connected to the other terminal 11 of the source. A resistor 18 and a capacitor 20 are connected in the order named between the control electrode of the SCR 14 and the anode of the SCR 16. A resistor 22 and a diode 24 are connected in series between the terminal 10 and the junction of the resistor 18 and the capacitor 20. The diode 24 is poled to conduct conventional current towards the control electrode of the SCR 14. The anode of a diode 26 is connected to the cathode of the SCR 16, and the cathode of the diode 26 is connected to the control electrode of the SCR 16. A capacitor 28 and a resistor 30 are connected in series in the order named between the cathode and the anode of the diode 26. A resistor 32 and a diode 34 are connected in series between the terminal 10 and the junction of the capacitor 28 and the resistor 30, the diode 34 being poled to conduct conventional current towards the terminal 10. A switch 36 is connected to prevent current flow, when open, through the series circuit including the resistor 32 and the diode 34. As shown in FIGURE 1, the switch 36 may be connected between the resistor 32 and the diode 34.

In the described circuit of FIGURE 1, when the switch 36 is open, neither SCR 14 nor SCR 16 is conductive even though the voltage from the source applied across their anodes and cathodes is, in alternate half cycles of the alternating current supplied by the source, of a proper polarity to cause conduction thereof. This is because the time constant circuit comprising the elements 26, 28 and 30, which controls the conductivity of the SCR 16 cannot charge due to the fact that the switch 36 is open, and further due to the fact that no charging potential is applied across the time constant circuit 22, 24 and 20 which controls the conductivity of the SCR 14.

When the switch 36 is closed and the terminal 10 is positive with respect to the terminal 11, no current can flow into the capacitor 28 due to the polarity of the diode 34. Therefore, even though the anode of the SCR 16 is positive with respect to its cathode, the SCR 16 is not conductive. During this polarity of the terminals 10 and 11, the polarity of the voltage applied to the SCR 14 is such as to render it non-conductive.

When the switch 36 is closed and the terminal 10 is negative with respect to the terminal 11, current flows through the resistor 32, the diode 34, into the capacitor 28 and back to the terminal 11 through the diode 26. During this charge cycle for the time constant circuit 26, 28 and 30, no current can flow into the control electrode of the SCR 16 since the voltage applied thereto by the connection of the cathode of the diode 26 to the control electrode of the SCR 16 is negative at the control electrode of the SCR 16 with respect to its cathode. The amount of current flowing in the circuit completed by the switch 36 is very small, whereby no noticeable transient voltage is caused by closing the switch 36. During its charge cycle, the capacitor 28 charges to the potential required to make the SCR 16 conductive. However, during this charge cycle for the capacitor 28, the voltage on the anode of the SCR 16 with respect to its cathode is negative whereby the SCR 16 cannot conduct during this charge cycle.

During the next half cycle the capacitor 28 discharges through the resistor 30 and through the control electrode to cathode path of the SCR 16. This discharge current is sufficient to turn the SCR 16 on or conductive since its anode is positive with respect to its cathode during the discharge cycle of the time constant circuit 26, 28, 30. The resistor 30 acts as a means to limit the maximum voltage that can build up across the capacitor 28 and the diode 26 in series. The voltage of the AC source is very low, less than a volt, when the SCR 16 is turned on, whereby turning on the SCR 16 causes no noticeable transients. The SCR 16 continues to conduct until the voltage thereacross is too low, again less than a volt, to sustain conduction of the SCR 16. Again the switching voltage is too low to cause noticeable transients.

When the SCR 16 is conductive, current flows through the load 12. A circuit for charging the capacitor 20 may be traced as follows: from the terminal of the load 12 that is connected to the terminal 10, through the resistor 22, the diode 24, the capacitor 20 and back to the other terminal of the load 12. The load 12 acts as a source for charging the time constant circuit comprising the elements 22, 24 and 20, and soon, the control electrode of the SCR 14 becomes high enough in potential to cause the SCR 14 to become conductive. However, the voltage across the anode and cathode of the SCR 14 is of the wrong polarity to cause conduction of the SCR 14 while this last mentioned time constant circuit is charging. However, at the beginning of the next cycle, when the terminal 11 is positive with respect to the terminal 10, the voltage on the control electrode of the SCR 14 is still great enough to cause the SCR 14 to become conductive. The capacitor 20 discharges through the resistor 18 and the control electrode to cathode circuit of the SCR 14 to turn the SCR 14 on. Again the voltages switched by the SCR 14, both when turned on and when turned off, are so low, below a volt, as to cause no noticeable transients. When the switch 36 is opened, no charge is applied to the capacitor 28 to render the SCR 16 conductive and current through the load 12 fails. This failure prevents charging of capacitor 20 whereby the SCR 14 is not rendered conductive and the circuit of FIGURE 1 becomes non-conductive when the switch 36 is opened.

FIGURE 2 differs from FIGURE 1 in that the switch 36 is omitted whereby the resistor 32 is always connected to the diode 34, and in that the collector to emitter path of a transistor 38 is connected across the resistor 30, the base of the transistor 38 being connected to its emitter by way of a resistor 40. Other similarly connected similar elements of FIGURES 1 and 2 have the same reference characters. The operation of the circuit of FIGURE 2 is the same as FIGURE 1 except for the stopping and starting thereof. In FIGURE 2, as long as the transistor 38 is made conductive by the current flowing into the base thereof from a suitable source, not shown, connected to terminals 39 and 41, the capacitor 28 cannot charge to cause conduction of the SCR 16 since the resistor 30 is shunted by the transistor 38. Therefore, as long as the transistor 38 is conductive, no power is supplied to the load 12. As soon as the transistor 38 is permitted to become non-conductive by removal of any source of current from between its base and emitter, the circuit of FIGURE 2 starts and operates like FIGURE 1. Since the amount of power necessary to make the transistor 38 conductive is very small, in the order of microwatts, a small amount of power can control a relatively very large amount of power, in the order of kilowatts, applied to the load 12.

The embodiment of FIGURE 3 differs from the embodiment of FIGURE 2 in that the control thereof is such that a controlling source of power turns the switching circuit of FIGURE 2 on while the controlling source of FIGURE 3 turns the control circuit thereof off. In FIGURES 2 and 3, similar reference characters are applied to similar elements that are similarly connected. In addition to these elements, a storage capacitor 42 is connected between the diode 34 and the collector of a PNP transistor 44, the emitter of which is connected to the terminal 11. A resistor 46 is connected between the base and the emitter of the transistor 44, and a diode 48 is connected between the collector of the transistor 44 and the control electrode of the SCR 16. The diode 48 is poled to conduct conventional current towards the control electrode of the SCR 16.

In FIGURE 3, when no current flows into the emitter of the transistor 44 from a source, not shown, connected to terminals 39, 41, the transistor 44 is non-conductive and no charge path exists for the capacitor 42 whereby the switching circuit of FIGURE 3 is off when no power is applied to the transistor 44. When the transistor 44 in FIGURE 3 is rendered conductive, the circuit of FIGURE 3 operates like the circuit of FIGURE 2 does when the transistor 38 of FIGURE 2 is non-conductive. The diode 48 prevents the resistance of the cathode to control electrode of the SCR 16 from shunting the emitter to collector path of the transistor 44. In the absence of the diode 48, the circuit of FIGURE 3 may continue to operate even when the transistor 44 is non-conductive.

The switching circuits of FIGURES 4 and 5 are adapted to be used with a center grounded three terminal AC source of supply voltage. In these circuits, one terminal of the control source, which turns these circuits on and off may be grounded.

Considering FIGURE 4 first, a source (not shown) of AC supply voltage is connected between the terminals 50 and 52, and the grounded center or intermediate terminal of the source is connected to a terminal 54. The terminal 50 is connected through a load 56 to the cathode of a SCR 58 and to the anode of a SCR 60. The anode of the SCR 58 and the cathode of the SCR 60 are connected to the terminal 52. A resistor 62 and a capacitor 64 are connected in the order named from the control electrode of the SCR 58 to the anode of the SCR 60. A diode 66 and a resistor 68 are connected between the terminal 50 and the junction 69 of the resistor 62 and the capacitor 64. The diode 66 is poled so that it conducts conventional current from the terminal 50 towards the junction 69. The terminal 52 is also connected through a diode 70 to the control electrode of the SCR 60. The diode 70 is poled to conduct conventional current towards the control electrode of the SCR 60. A capacitor 72 and a resistor 74 are connected across the diode 70. The center terminal 54 is connected through the emitter to collector path of a NPN transistor 76, a diode 78 and a resistor 80 in series to the junction 81 of the capacitor 72 and the resistor 74. The diode 78 is poled to conduct conventional current away from said junction 81. A resistor 82 is connected between the base and the emitter of the transistor 76.

When, in the circuit of FIGURE 4, the transistor 76 is non-conductive, as when no current is fed into its base electrode from a suitable source, not shown, connected to terminals 79, 81, even though the terminal 52 is positive with respect to the terminal 54, no circuit exists for charging the capacitor 72 whereby no voltage can build up thereacross. Since the SCR 60 is made conductive (even when its anode is positive with respect to its cathode) by the voltage applied to the control electrode thereof by the capacitor 72, the SCR 60 remains non-conductive while the transistor 76 is non-conductive. Since no current flows through the load 56, no charge is applied to the capacitor 64, whereby the SCR 58 controlled thereby cannot become conductive.

Therefore, when no power is applied to the transistor 76 to render it conductive, neither SCR 58 nor SCR 60 is conductive and no current flows through the load 56. When the transistor 76 is rendered conductive and the terminal 52 is positive, a circuit exists as follows: from the terminal 52, through the diode 70, the capacitor 72, the resistor 80, the diode 78, the emitter to collector path of the transistor 76 and back to the grounded center terminal 54. The diode 70 in the circuit of FIGURE 4 serves the same purpose as the diode 26 of FIGURES 1 and 2. During this half cycle, however, the voltage across the SCR 60 is incorrectly poled to render it conductive. When during the next half cycle the terminal 52 becomes negative and the terminal 50 becomes positive, the voltage across the SCR 60 is correct to permit it to become conductive. The capacitor 72 discharges through the current limiting resistor 74 and through the control electrode to cathode path of the SCR 60 and renders it conductive. Current flows from the terminal 50 through the load 56, the anode to cathode path of the SCR 60 and back to the terminal 52. The load 56 then furnishes power to charge the capacitor 64 during the half cycle that the voltage applied to the SCR 58 is improperly poled for conduction thereof, and the SCR 58 is caused to become conductive during the next succeeding half cycle when the voltage is of the proper polarity due to the discharge of the capacitor 64, as described above in connection with the capacitor 20 and the SCR 14 of FIGURE 1. In FIGURE 4 as in FIGURES 1 through 3, the SCR's 58 and 60 start to conduct (when they do) when the voltage of the proper polarity arrives at a value a little less than a volt and continue to conduct until the voltage of the proper potential decreases to a value less than a volt. The current switched by the transistor 76 is also very small. Therefore the switching circuit of FIGURE 4 produces no noticeable transient voltages and a small amount of input control power applied to the device 76 switches a much larger amount of controlled power flowing through the load 56.

FIGURES 5 differs from FIGURE 4 only in the control thereof. Therefore, similar elements similarly connected in FIGURES 4 and 5 have the same reference characters. In FIGURE 5, SCR 84 is substituted for the diode 78 and the transistor 76 while the resistor 82 of FIGURE 4 is omitted. The SCR 84 is rendered conductive by a positive control voltage applied to its control electrode from a suitable source, not shown, connected to terminals 79 and 81 with respect to its cathode and remains conductive until the positive control voltage ceases and thereafter as the voltage across the SCR 84 is positive on its anode with respect to its cathode and is also greater than a value less than about a volt. During alternate half cycles of the supply connected between the terminals 50 and 52, the SCR 84 becomes nonconductive whereby, when the control voltage applied thereto from terminals 79 and 81 ceases, the switching circuit of FIGURE 5 is turned off.

While several embodiments have been described, modifications thereof are possible within the spirit of this invention. The above description is therefore to be taken as illustrative and not in a limiting sense.

What is claimed is:

1. A switching circuit which produces substantially no transients comprising a first and a second controlled rectifier each having a control electrode, an anode and a cathode, each of said controlled rectifiers becoming conductive when a voltage of sufficient value is applied between its control electrode and cathode and when a voltage above a first threshold value is applied between its anode and cathode, said controlled rectifier when once conducting remaining conductive until the voltage between its anode and cathode reduces to a value below a second threshold value, a first and a second capacitive time constant circuit, means for connecting said first and second controlled rectifiers in opposite polarity directions across an alternating current source, means for charging said first capacitive time constant circuit from said source during the half cycle of said source when the voltage applied to said first controlled rectifier is in its non-conducting direction, means connected to said control electrode of said first rectifier for discharging said first capacitive time constant circuit to render said first controlled rectifier conductive and means to charge said second capacitive time constant circuit during the next half cycle of said source when the voltage across said second controlled rectifier is in its non-conducting direction, and means connected to said control electrode of said second rectifier to discharge said second capacitive time constant circuit to render said second controlled rectifier conductive during the next succeeding half cycle of said source, said first capacitive time constant circuit being charged by said first-mentioned charging means during said succeeding half cycle.

2. The invention as expressed in claim 1 in which a load is provided in series with the first of said controlled rectifiers and in which said second capacitive time constant circuit is charged from across said load.

3. The invention as expressed in claim 1 in which a load is provided in series with a first of said controlled rectifiers and in which said second capacitive time constant circuit is charged from across said load and further in which means are provided to prevent charging of said first capacitive time constant circuit whereby said first controlled rectifier is not rendered conductive and no current flows through said load whereby said second capacitive time constant circuit is not charged.

4. A switching circuit which produces substantially no transients comprising a first and a second controlled rectifier each having a control electrode, an anode and a cathode, each of said controlled rectifiers becoming conductive when a voltage of sufficient value is applied between its control electrode and cathode and when a voltage above a first threshold value is applied between its anode and cathode, said controlled rectifier when conducting remaining conductive until the voltage between its anode and cathode reduces to a value below a second threshold value, a first and a second time constant circuit, means for connecting the anode of said first controlled rectifier and the cathode of said second controlled rectifier to one of the opposite terminals of an A.C. source having two opposite terminals and a grounded intermediate terminal, means for connecting the cathode of said first controlled rectifier and the anode of said second controlled rectifier to the second of said opposite terminals, means for charging said first time constant circuit from said source by way of said second and said intermediate terminal during the half cycle when the voltage applied across said first controlled rectifier is in its non-conductive direction, means to discharge said first time constant circuit through the control electrode to cathode path of said first controlled rectifier to render said first controlled rectifier conductive and to charge said second time constant circuit during the next half cycle of said source when the voltage applied to said second controlled rectifier is in its non-conductive direction, and means to discharge said second time constant circuit through the control electrode to cathode path of said second controlled rectifier to render said second controlled rectifier conductive during the next succeeding half cycle of said source.

5. The invention as expressed in claim 4 in which a load is provided between said one terminal of said source and the anode of said one controlled rectifier and in which said means for charging said second time constant circuit includes said load.

6. The invention as expressed in claim 4 in which means are provided to prevent said first time constant circuit from charging, said means comprising a device which has conducting and non-conducting states connected between said intermediate terminal and another terminal of said source.

7. A switching means which produces substantially no transients comprising
   a first and a second terminal between which a source of alternating current may be connected,
   a load,
   a first and a second controlled rectifier each having an anode, a cathode and a control electrode, said controlled rectifier becoming conductive when a voltage of sufficient value is applied between its control electrode and its cathode and when a voltage above a first threshold value is applied between its anode and cathode, said controlled rectifier once conductive remaining conductive until the voltage between its anode and cathode reduces to a value below a second threshold value,
   a connection from the first of said terminals through said load to the anode of the first of said rectifiers and to the cathode of the second of said rectifiers,
   a connection from the second of said terminals to the cathode of the second of said rectifiers and to the anode of the second of said rectifiers,
   a first and a second capacitive time constant circuit,
   means to charge said first capacitive time constant circuit from said first terminal through a diode poled in an opposite direction with respect to said source as compared to the poling of said first controlled rectifier with respect to said source,
   means to discharge said time constant circuit between the control electrode and the cathode of said first controlled rectifier to render it conductive,
   means to charge said second capacitive time constant circuit from across said load, and
   means to discharge said second capacitive time constant circuit between the control electrode and cathode of said second controlled rectifier to render it conductive.

8. The invention as expressed in claim 7 in which means are provided to prevent charging of said first capacitive time constant circuit.

9. A switching means which produces substantially no transients comprising
   a first and a second terminal between which a source of alternating current may be connected and an intermediate terminal to which the ground point of said source may be connected,
   a load,
   a first and a second controlled rectifier each having an anode, a cathode and a control electrode, said controlled rectifier becoming conductive when a voltage of sufficient value is applied between its control electrode and its cathode and when a voltage above a first threshold value is applied between its anode and cathode, said controlled rectifier once conductive remaining conductive until the voltage between its anode and cathode reduces to a value below a second threshold value,
   a connection from the first of said terminals through said load to the anode of the first of said rectifiers and to the cathode of the second of said rectifiers,
   a connection from the second of said terminals to the cathode of the second of said rectifiers and to the anode of the second of said rectifiers,
   a first and a second time constant circuit,
   means to charge said first time constant circuit from between said second terminal and said intermediate terminal,
   means to discharge said time constant circuit between the control electrode and the cathode of said first controlled rectifier to render it conductive,
   means to charge said second time constant circuit from across said load, and
   means to discharge said second time constant circuit between the control electrode and cathode of said second controlled rectifier to render it conductive.

10. The invention as expressed in claim 9 in which means are provided to prevent charging of said first time constant circuit.

11. The invention as expressed in claim 9 in which means are provided to prevent charging of said first time constant circuit, in which said charging preventing means comprises a controllable device whose conductivity can be varied connected between said time constant circuit and said intermediate terminal, and means for varying the conductivity of said device.

References Cited
UNITED STATES PATENTS

| | | | |
|---|---|---|---|
| 3,197,676 | 7/1965 | Jones | 307—252 X |
| 3,238,390 | 3/1966 | Pinckaers | 307—252 |
| 3,388,269 | 6/1968 | Bertioli | 307—252 |

DONALD D. FORRER, Primary Examiner

U.S. Cl. X.R.

307—305; 315—251; 323—24